United States Patent
No et al.

(10) Patent No.: US 11,870,889 B2
(45) Date of Patent: Jan. 9, 2024

(54) METHOD AND APPARATUS WITH HOMOMORPHIC ENCRYPTION

(71) Applicants: Samsung Electronics Co., Ltd., Suwon-si (KR); Seoul National University R&DB Foundation, Seoul (KR); Industry Academic Cooperation Foundation, Chosun University, Gwangju (KR)

(72) Inventors: Jong-Seon No, Seoul (KR); Yongwoo Lee, Seoul (KR); Young-Sik Kim, Gwangju (KR)

(73) Assignees: Samsung Electronics Co., Ltd., Suwon-si (KR); Seoul National University R & DB Foundation, Seoul (KR); Industry Academic Cooperation Foundation, Chosun University, Gwangju (KR)

( * ) Notice: Subject to any disclaimer, the term of this patent is extended or adjusted under 35 U.S.C. 154(b) by 137 days.

(21) Appl. No.: 17/516,924

(22) Filed: Nov. 2, 2021

(65) Prior Publication Data
US 2022/0271922 A1    Aug. 25, 2022

(30) Foreign Application Priority Data

Feb. 23, 2021  (KR) .......... 10-2021-0024262
May 14, 2021  (KR) .......... 10-2021-0062640

(51) Int. Cl.
*H04L 9/08*    (2006.01)
*H04L 9/06*    (2006.01)
(Continued)

(52) U.S. Cl.
CPC ............ *H04L 9/0825* (2013.01); *G06F 7/523* (2013.01); *G06F 7/766* (2013.01); *G06F 17/16* (2013.01); *H04L 9/008* (2013.01); *H04L 9/0618* (2013.01)

(58) Field of Classification Search
CPC ..... H04L 9/0825; H04L 9/008; H04L 9/0618; G06F 7/523; G06F 7/766; G06F 17/16
See application file for complete search history.

(56) References Cited

U.S. PATENT DOCUMENTS

2013/0170640 A1*  7/2013  Gentry .................. H04L 9/008
                                                                380/30
2013/0216044 A1*  8/2013  Gentry .................. H04L 9/008
                                                                380/277
(Continued)

FOREIGN PATENT DOCUMENTS

KR    10-1600016 B1    3/2016
KR    10-1608515 B1    4/2016
(Continued)

OTHER PUBLICATIONS

Bootstrapping for approximate homomorphic encryption, JH Cheon, K Han, A Kim, M Kim, Y Song—. . . , Tel Aviv, Israel, Apr. 29-May 3, 2018 (Year: 2018).*
(Continued)

*Primary Examiner* — Vu V Tran
(74) *Attorney, Agent, or Firm* — NSIP Law

(57) ABSTRACT

A processor-implemented method with homomorphic encryption includes: receiving a first ciphertext corresponding to a first modulus; generating a second ciphertext corresponding to a second modulus by performing modulus raising on the first ciphertext; and performing bootstrapping
(Continued)

by encoding the second ciphertext using a commutative property and an associative property of operations included in a rotation operation.

15 Claims, 4 Drawing Sheets

(51) Int. Cl.
    *H04L 9/00*         (2022.01)
    *G06F 7/76*         (2006.01)
    *G06F 17/16*       (2006.01)
    *G06F 7/523*       (2006.01)

(56) References Cited

U.S. PATENT DOCUMENTS

2019/0334694 A1* 10/2019 Chen ................. H04L 9/008
2021/0194666 A1*  6/2021 Georgieva .......... H04L 9/008

FOREIGN PATENT DOCUMENTS

| KR | 10-1618941 B1 | 5/2016 |
|----|---------------|--------|
| KR | 10-1861089 B1 | 5/2018 |
| KR | 10-1919940 B1 | 11/2018 |
| KR | 10-1965628 B1 | 4/2019 |
| KR | 10-1971215 B1 | 4/2019 |
| KR | 10-2040106 B1 | 11/2019 |
| KR | 10-2040120 B1 | 11/2019 |
| KR | 10-2020-0070121 A | 6/2020 |

OTHER PUBLICATIONS

Bootstrapping for Approximate Homomorphic Encryption, by Cheon et al., published 2018 (Year: 2018).*
Better Bootstrapping for Approximate Homomorphic Encryption, by Kyoohyung et al., published 2020 (Year: 2020).*
Lee, Joon-Woo et al. "Study on Security of Homomorphic Encryption for Arithmetic Approximate Numbers" *Seoul National University* (1 page in English, 2 pages in Korean).
Cheon, Jung Hee et al. "Bootstrapping for Approximate Homomorphic Encryption" *Seoul National University* Jul. 25, 2018 pp. 1-21.
Chen, Hao et al. "Improved Bootstrapping for Approximate Homomorphic Encryption" *Microsoft Research University of California, San Diego* Oct. 28, 2018 pp. 1-21.
Lee, Yongwoo et al. "High-Precision and Low-Complexity Approximate Homomorphic Encryption by Error Variance Minimization" *Department of Electrical and Computer Engineering, INMC, Seoul National University, Seoul, 08826, Korea IACR* 2020 pp. 1-38.
Han, Kyoohyung et al. "Better Bootstrapping for Approximate Homomorphic Encryption" *Coinplug Incorporated*, Republic of Korea Feb. 14, 2020 pp. 1-26.
Bossuat, Jean-Philippe et al. "Efficient Bootstrapping for Approximate Homomorphic Encryption with Non-Sparse Keys" *Ecole Polytechnique federale de Lausanne* Dec. 3, 2020 pp. 1-46.

* cited by examiner

METHOD AND APPARATUS WITH HOMOMORPHIC ENCRYPTION

CROSS-REFERENCE TO RELATED APPLICATIONS

This application claims the benefit under 35 USC § 119(a) of Korean Patent Application No. 10-2021-0024262 filed on Feb. 23, 2021, and Korean Patent Application No. 10-2021-0062640 filed on May 14, 2021, in the Korean Intellectual Property Office, the entire disclosures of which are incorporated herein by reference for all purposes.

BACKGROUND

1. Field

The following description relates to a method and apparatus with homomorphic encryption.

2. Description of Related Art

Fully homomorphic encryption is an encryption scheme that may enable an arbitrary logical operation or a mathematical operation to be performed on encrypted data. A fully homomorphic encryption method may maintain security in data processing.

However, it may be difficult to process encrypted data using the conventional encryption method, and thus, the conventional encryption method may be inadequate for protecting customer privacy.

Fully homomorphic encryption may enable customers to receive many services while preserving privacy.

In performing bootstrapping in the conventional encryption method, there is a little ciphertext modulus corresponding to the remaining level ciphertext, and thus, a large parameter needs to be utilized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with homomorphic encryption includes: receiving a first ciphertext corresponding to a first modulus; generating a second ciphertext corresponding to a second modulus by performing modulus raising on the first ciphertext; and performing bootstrapping by encoding the second ciphertext using a commutative property and an associative property of operations included in a rotation operation.

The generating of the second ciphertext may include generating the second ciphertext by performing modulus raising on the first ciphertext such that the value of the first modulus multiplied by a predetermined value is the second modulus.

The performing of the bootstrapping may include: performing a permutation operation on the second ciphertext; and performing the bootstrapping by performing a key switching operation based on a result of the permutation operation.

The performing of the bootstrapping by performing the key switching operation based on the result of the permutation operation may include: performing a rescaling operation based on the permutation operation; performing a decompose operation on a result of the rescaling operation; and performing a sum of multiplications on a result of the decompose operation.

The performing of the rescaling operation based on the permutation operation may include: performing a multiplication of the result of the permutation operation and a plaintext; and rescaling a result of the multiplication.

The performing of the multiplication between the result of the permutation operation and the plaintext may include performing a multiplication of the result of the permutation operation and a diagonal component of a matrix corresponding to the plaintext.

The performing of the bootstrapping by performing the key switching operation based on the result of the permutation operation further may include: generating an addition result by adding a result of the sum of multiplications; and performing a modulus down operation on the addition result.

The performing of the bootstrapping may include performing the bootstrapping by performing modulus reduction on a result of encoding the second ciphertext.

The performing of the bootstrapping by performing the modulus reduction on the result of encoding the second ciphertext may include performing the bootstrapping by decoding a result of the modulus reduction.

In another general aspect, one or more embodiments include a non-transitory computer-readable storage medium storing instructions that, when executed by a processor, configure the processor to perform any one, any combination, or all operations and methods described herein.

In another general aspect, an apparatus with homomorphic encryption includes: a receiver configured to receive a first ciphertext corresponding to a first modulus; and a processor configured to generate a second ciphertext corresponding to a second modulus by performing modulus raising on the first ciphertext, and perform bootstrapping by encoding the second ciphertext using a commutative property and an associative property of operations included in a rotation operation.

For the generating of the second ciphertext, the processor is configured to generate the second ciphertext by performing modulus raising on the first ciphertext such that the value of the first modulus multiplied by a predetermined value is the second modulus.

For the performing of the bootstrapping, the processor may be configured to: perform a permutation operation on the second ciphertext; and perform the bootstrapping by performing a key switching operation based on a result of the permutation operation.

For the performing of the bootstrapping by performing the key switching operation based on the result of the permutation operation, the processor may be configured to: perform a rescaling operation based on the permutation operation; perform a decompose operation on a result of the rescaling operation; and perform a sum of multiplications on a result of the decompose operation.

For the performing of the rescaling operation based on the permutation operation, the processor may be configured to: perform a multiplication of the result of the permutation operation and a plaintext; and rescale a result of the multiplication.

For the performing of the multiplication between the result of the permutation operation and the plaintext, the processor may be configured to perform a multiplication of the result of the permutation operation and a diagonal component of a matrix corresponding to the plaintext.

For the performing of the bootstrapping by performing the key switching operation based on the result of the permutation operation, the processor may be configured to: generate an addition result by adding a result of the sum of multiplications; and perform a modulus down operation on the addition result.

For the performing of the bootstrapping, the processor may be configured to perform the bootstrapping by performing modulus reduction on a result of encoding the second ciphertext.

For the performing of the bootstrapping by performing the modulus reduction on the result of encoding the second ciphertext, the processor may be configured to perform the bootstrapping by decoding a result of the modulus reduction.

In another general aspect, a processor-implemented encryption method with homomorphic encryption includes: generating a second ciphertext corresponding to a second modulus by performing modulus raising on a first ciphertext corresponding to a first modulus; rescaling a result of a multiplication between a plaintext and a result of a permutation operation performed on the second ciphertext; performing a sum of multiplications on a result of a decompose operation performed on a result of the rescaling; and performing a modulus down operation based on a result of the sum of multiplications.

A key switching operation may include the rescaling, the decompose operation, and the sum of multiplications.

A bootstrapping encoding the second ciphertext may include the permutation operation and the key switching operation.

The modulus down operation may include: generating an addition result by adding a result of the sum of multiplications; and performing the modulus down operation on the addition result.

Other features and aspects will be apparent from the following detailed description, the drawings, and the claims.

Figure 1:
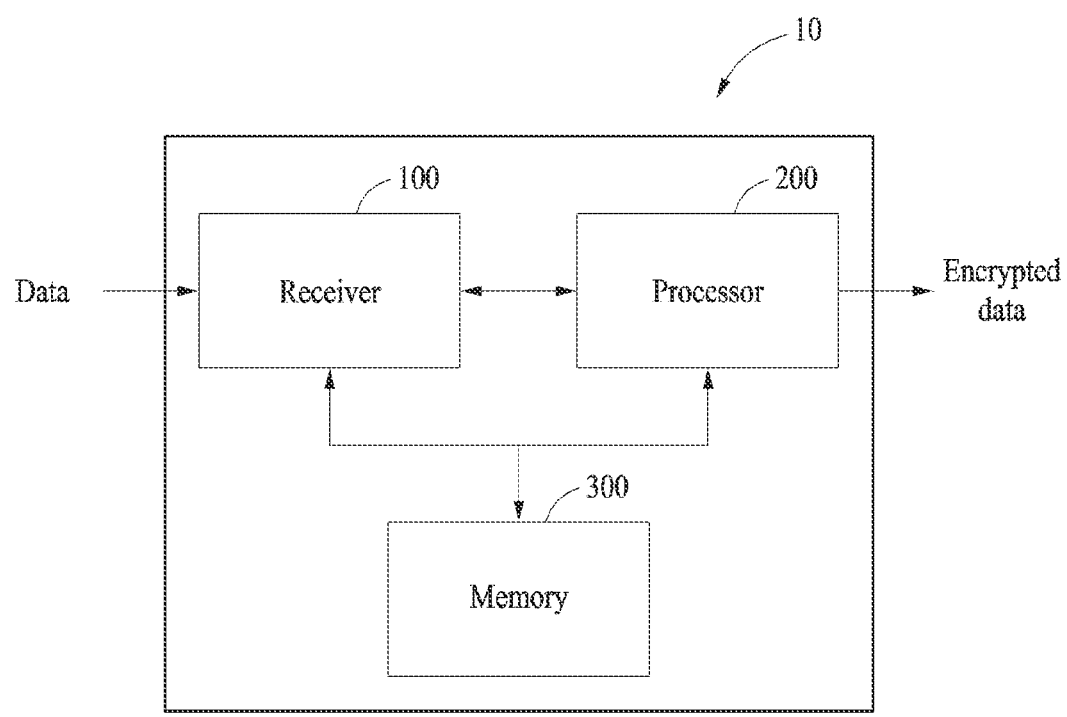
FIG. 1 illustrates an example of an encryption apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The terminology used herein is for the purpose of describing particular examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which examples belong and based on an understanding of the disclosure of the present application. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of an encryption apparatus.

Referring to FIG. 1, an encryption apparatus 10 may encrypt data. The encryption apparatus 10 may generate encrypted data through encryption of data. Hereinafter, encrypted data may be referred to as ciphertext.

The encryption apparatus 10 may provide an encryption technique for performing an operation on data encrypted using homomorphic encryption without decryption. For example, the encryption apparatus 10 may decrypt a result of an operation performed by a processor 200 encrypted using homomorphic encryption, thereby deriving completely or approximately the same result as an operation on plaintext data. The encryption apparatus 10 may provide homomorphic encryption operations for real or complex numbers.

The encryption apparatus 10 may perform bootstrapping used for homomorphic encryption. The encryption device 10 may perform bootstrapping through modulus raising, encoding, modulus reduction, and/or decoding.

The encryption apparatus 10 may include a receiver 100 and the processor 200. The encryption apparatus 10 may further include a memory 300.

The receiver 100 may include a receiving interface. The receiver 100 may receive a plaintext and/or a ciphertext. The ciphertext may have a corresponding modulus. For example, the receiver 100 may receive a first ciphertext corresponding to a first modulus. The receiver 100 may output the received plaintext and/or ciphertext to the processor 200.

The processor 200 may process data stored in the memory 300. The processor 200 may execute instructions stored in a non-transitory computer-readable storage medium (e.g., the memory 300) that configure the processor 200 to process the data when executed.

The "processor 200" may be hardware such as a data processing device including a circuit having a physical structure to perform operations. For example, the operations may be performed when instructions stored in the non-transitory computer-readable storage medium are executed.

For example, the data processing device may include a microprocessor, a central processing unit (CPU), a processor core, a multi-core processor, a multiprocessor, an application-specific integrated circuit (ASIC), and/or a field-programmable gate array (FPGA).

The processor 200 may perform encryption using homomorphic encryption. The processor 200 may generate a second ciphertext corresponding to a second modulus by performing modulus raising on the first ciphertext.

The processor 200 may generate the second ciphertext by performing the modulus raising on the first ciphertext such that the value of the first modulus multiplied by a predetermined value is the second modulus.

The processor 200 may perform bootstrapping by encoding the second ciphertext using a commutative property and an associative property of operations included in a rotation operation.

The processor 200 may perform a permutation operation on the second ciphertext. The processor 200 may perform bootstrapping by performing a key switching operation based on a result of the permutation operation.

The processor 200 may perform a rescaling operation based on the permutation operation. The processor 200 may perform a multiplication of the result of the permutation operation and the plaintext. For example, the processor 200 may perform a multiplication of the result of the permutation operation and a diagonal component of a matrix corresponding to the plaintext.

The processor 200 may rescale a result of the multiplication. The processor 200 may perform a decompose operation on a result of the rescaling operation. The processor 200 may perform a sum of multiplications on a result of the decompose operation. Hereinafter, the sum of multiplications may be referred to as MultSum.

The processor 200 may generate an addition result by adding the result of MultSum. The processor 200 may perform a modulus down operation on the addition result.

The processor 200 may perform the bootstrapping by performing modulus reduction on a result of encoding the second ciphertext. The processor 200 may perform the bootstrapping by decoding a result of the modulus reduction.

The memory 300 may store instructions executable by the processor. For example, the instructions may include instructions to perform an operation of the processor and/or an operation of each element of the processor.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), and/or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), and/or an insulator resistance change memory.

Figure 2:
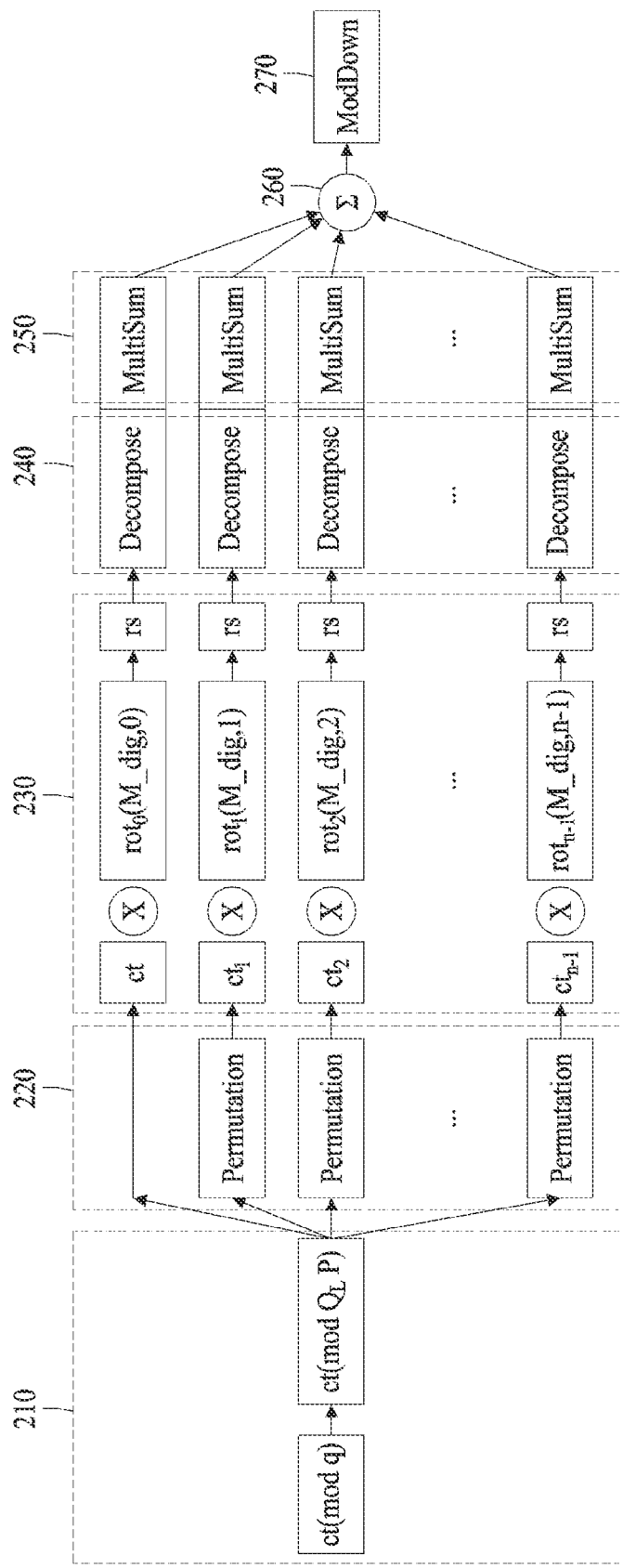
FIG. 2 illustrates an example of an operation of an encryption apparatus.

FIG. 2 illustrates an example of an operation of an encryption apparatus (e.g., the encryption apparatus of FIG. 1).

Referring to FIG. 2, a processor (for example, the processor 200 of FIG. 1) may perform encryption using homomorphic encryption. Homomorphic encryption may refer to an encryption method for performing an operation on a plaintext that is encrypted. For example, homomorphic encryption may include a Cheon-Kim-Kim-Song (CKKS) encryption method, a Fan-Vercauteren (FV) encryption method, or a Brakersk-Gentry-Vaikuntanathan (BGV) encryption method.

A plaintext may include real numbers and/or complex numbers. The processor 200 may encode the plaintext to generate a plaintext including polynomials. The processor 200 may generate a ciphertext by encrypting the plaintext including polynomials.

The processor 200 may perform a homomorphic operation on the ciphertext. The processor 200 may obtain the plaintext including polynomials by decrypting the ciphertext. Decryption may refer to a process of decrypting a ciphertext using a secret key.

The processor 200 may obtain the plaintext including real numbers or complex numbers by decoding the plaintext including polynomials. Decoding may convert a polynomial plaintext into a real and/or complex plaintext without using a key.

The processor 200 may perform bootstrapping on the ciphertext. Bootstrapping may refer to a process of restoring, when all levels of the ciphertext are consumed, the consumed levels to original states.

In other words, a purpose of bootstrapping may be to generate a ciphertext with level L having the same message by refreshing a ciphertext with level 0 on which multiplication can be performed no more.

The level of the ciphertext may indicate the maximum depth of a circuit that the ciphertext can compute in a current state or the number of multiplications that are possible without bootstrapping. The ciphertext may have a pair of two elements on an integer polynomial ring. Hereinafter, a modulus may refer to the modulus value of the polynomial ring. Bootstrapping may include modulus raising, encoding, modulus reduction, and decoding processes.

After calculating a homomorphic modular reduction function, the processor 200 may reversely convert the converted ciphertext into another ciphertext ct' that encrypts slots of a previous ciphertext as the coefficients of its message. Such conversion and reverse conversion operations may be referred to as encoding (or CoeffToSlot) and decoding (or SlotToCoeff), respectively.

In operation 210, the processor 200 may generate a second ciphertext corresponding to a second modulus by performing modulus raising on a first ciphertext. The processor 200 may generate the second ciphertext by performing modulus raising on the first ciphertext such that the value of the first modulus multiplied by a predetermined value is the second modulus.

Modulus raising may refer to a process of changing a modulus of a ciphertext to a larger modulus. In the example of FIG. 2, the processor 200 may generate the second ciphertext having a modulus of $q_L \cdot Q'$ multiplied by a predetermined value $Q' \leq Q$ by performing modulus raising on the first ciphertext having a modulus of q.

If a ciphertext $C$ satisfies $m(X)=[\langle C, sk \rangle]_q$, then $t(X)=qI(X)+m(X)$ may be obtained from $t(X)=qI(X)+m(X)$ for $I(X) \in \mathcal{R}$ with a bound of $\|I(X)\|_\infty < K$. Here, K has high-probability upper bounded $\mathcal{O}(\sqrt{h})$.

The processor 200 may perform the public calculation of the remaining coefficients of t(X) when dividing by q. Modulus reduction may be computed by an approximate polynomial, and the important part of bootstrapping may be to find a polynomial that approximates a modulus reduction function.

Hereinafter, an encoding process of the processor 200 will be described.

The processor 100 may perform encoding. The encoding may be referred to as CoeffToSlot. The processor 200 may encode a plaintext that is encrypted. The processor 200 may perform encoding by using an operation that multiplies a CRT matrix. Encoding may include rotation and plaintext multiplication.

Approximate homomorphic operation may be performed in a plaintext slot. The processor 200 may perform encoding using a component-wise operation of coefficients. In order to process t(X), $\mathrm{Emb}^{-1} \circ \pi^{-1}$ may be performed homomorphically using matrix multiplication, fast Fourier transform (FFT)-like operations, or a hybrid method of matrix multiplication and FFT-like operations.

Here, EMb denotes canonical embedding, wherein canonical embedding of $a(X) \in \mathbb{Q}/\langle \Phi_M(X) \rangle$ into $\mathbb{C}^N$ indicates a vector of a calculated value a at the roots of $\Phi_M(X)$, and $\mathrm{Emb}^{-1}$ denotes its inverse.

π denotes a natural projection from $\mathbb{H} = \{(z_j)_j \in \mathbb{Z}_M^* : z_j = \overline{z_{-j}}\}$ to $\mathbb{C}^{N/2}$, where $\mathbb{Z}_M^*$ is the multiplicative group of integer modulo M.

The processor 200 may obtain $$z'_0 = \left(t_0, \ldots, t_{\frac{N}{2}-1}\right) \text{ and}$$

$$z'_1 = \left(t_{\frac{N}{2}}, \ldots, t_{N-1}\right) \left(\text{or } \left(t_0 + i \cdot t_{\frac{N}{2}}, \ldots, t_{\frac{N}{2}-1} + i \cdot t_{N-1}\right)\right)$$

which is the combination of the two using imaginary numbers) as the result of $\mathrm{Emb}^{-1} \circ \pi^{-1}$ that is homomorphically performed. Here, $t_j$ denotes a j-th coefficient of t(X).

The matrix multiplication may include three operations. The first may be to properly rotate a ciphertext, the second may be to multiply the rotated ciphertexts by diagonal components of a matrix, and the third may be to sum up the ciphertexts.

The processor 200 may perform a homomorphic evaluation of encoding of encoding (or CoeffToSlot operation) without consuming the level of the ciphertext.

In ordinary modulus raising, a ciphertext modulus is changed to $q_L$, but the processor 200 may change the ciphertext modulus to $q_L \cdot Q'$ for $Q' \leq Q$.

Using the processor 200, the encryption apparatus 10 of one or more embodiments may perform bootstrapping by encoding the second ciphertext using a commutative property and an associative property of operations included in a rotation operation. For example, the encryption apparatus 10 of one or more embodiments may increase the operation rate by changing the order of the addition operation and the modulus down operation using a commutative property.

Addition and key switching may establish an associative property. The processor 200 may perform plaintext multiplication and addition before key switching by using the commutative property.

The rotation operation may include a permutation operation and a key switching operation. The key switching operation may include a decompose operation, a sum of multiplications operation, and a modulus down operation. The processor 200 may perform an addition after the sum of multiplications and last perform the modulus down, thereby increasing the bootstrapping operation rate.

The conventional bootstrapping method may not increase the modulus of the ciphertext to more than $q_L$ to ensure safety, while the processor 200 may perform plaintext multiplication, rescaling, and addition using the commutative property and the associative property even when the modulus of the ciphertext is more than $q_L$.

The plaintext multiplication and rescaling operations may establish the commutative property. The processor 200 may change the modulus to a value greater than $q_L$ in the modulus raising process by performing rescaling before the decompose operation.

The processor 200 may perform plaintext-ciphertext multiplication, rescaling, addition, and permutation operations without key switching.

In operation 220, the processor 200 may perform permutation operations on the second ciphertext. The processor 200 may perform the permutation operations by changing the order of coefficients.

The ciphertext may include a tuple, that is, $(c_0, c_1)$, with length of "2", having two integer polynomials (elements of $Z_{q[X]}$) as elements. Here, $c_0$ and $c_1$ may be included in $Z_{q[X]}/\langle X^{N+1} \rangle$.

$c_0$ and $c_1$ may include N coefficients, and the processor 200 may perform the permutation operations by changing the order of the N coefficients.

For example, if the results of permuting $c_0$ and $c_1$ are $c_0'$ and $c_1'$ and the result of applying the same permutation operation to a secret key s is s', then the inner product of ($c_0'$, $c_1'$) and (1, s') may obtain the same result as that obtained when permutation is performed on the inner product of ($c_0$, $c_1$) and (1, s).

The processor 200 may change messages corresponding to the polynomials into permuted ciphertexts by key-switching (c_0', c_1') to ciphertexts s, rather than s'.

When not all permutation operations may be meaningful, the processor 200 may use only permutations that rotate or conjugate corresponding real and/or complex messages when applied to messages.

The processor 200 may perform the key switching operation based on results of the permutation operations. The key switching operation may include a decompose operation, a sum of multiplications operation, and a modulus down operation.

The processor 200 may reduce the total number of operations used for bootstrapping by using the commutative and associative properties of permutation and key switching operations. In operation 230, the processor 200 may perform a matrix multiplication and rescaling operations on results of the permutation operations.

The processor 200 may perform multiplications between the results of the permutation operations and the plaintext. The processor 200 may multiply the results of the permutation operations by diagonal components of a matrix corresponding to the plaintext.

The processor 200 may rescale results of the multiplications. Specifically, the processor 200 may rescale the results of multiplications with the diagonal components of the matrix. In this case, the processor 200 may perform the multiplications by encoding the diagonal components of the matrix with arbitrary scaling factors.

Rescaling may include a process of dividing the messages by constants by dividing all the coefficients of the ciphertexts by the same constant. The processor 200 may multiply the scaling factors to preserve bits below the decimal point, of the messages. The processor 200 may multiply the messages by a delta value as a rescaling factor.

The processor 200 may divide the delta value multiplied by the message through rescaling, thereby maintaining the value multiplied by the messages to be constant. For example, if the modulus of the ciphertext is $q_L$, then $q_L = q_0 * _1 * p_2 * \ldots * p_L$. In this case, "$p_i$"s may have values close to delta.

The processor 200 may divide both coefficients of $c_0$ and $c_1$ by $p_L$ in $<(c_0, c_1), (1, s)> = m(\bmod\ q_L)$, thereby changing a message m into $m/p_L$ while changing the modulus to $q_{L-1}$, rather than $q_L$. That is, rescaling may be performed by changing it to $<(c_0/p_L, c_1/p_L), (1, s)> = m/p_L\ (\bmod\ q_{L-1})$.

In operation 240, the processor 200 may perform decompose operations on results of the rescaling operations. In operation 250, the processor 200 may perform a sum of multiplications on results of the decompose operations.

In operation 260, the processor 200 may generate an addition result by adding results of the sum of multiplications. In operation 270, the processor 200 may perform a modulus down operation on the addition result.

The processor 100 may perform a homomorphic modular reduction (or modular reduction) operation. In detail, the processor 100 may perform the modular reduction operation using a homomorphic modular reduction function.

After CoeffToSlot conversion is performed, the processor 200 may perform a modular reduction homomorphically on each slot in modulus $q_0$.

The processor 200 may perform encoding using the commutative and associative properties, and maintain the modulus of the ciphertext to be $q_L$ as a result of the encoding, and consume no additional levels. That is, by performing the encoding operation as described above, the processor 200 may perform the encoding process without consuming levels.

Using the processor 200, the encryption apparatus 10 of one or more embodiments may reduce the size of all parameters by reducing the depth of bootstrapping. Through this, the encryption apparatus 10 of one or more embodiments may reduce operation time and power consumption and reduce the size of hardware by using the above-described encoding process.

The processor 200 may perform decoding. Decoding may be an inverse operation of encoding. The processor 200 may perform decoding by multiplying an inverse matrix of the matrix multiplied in the encoding process.

Figure 3:
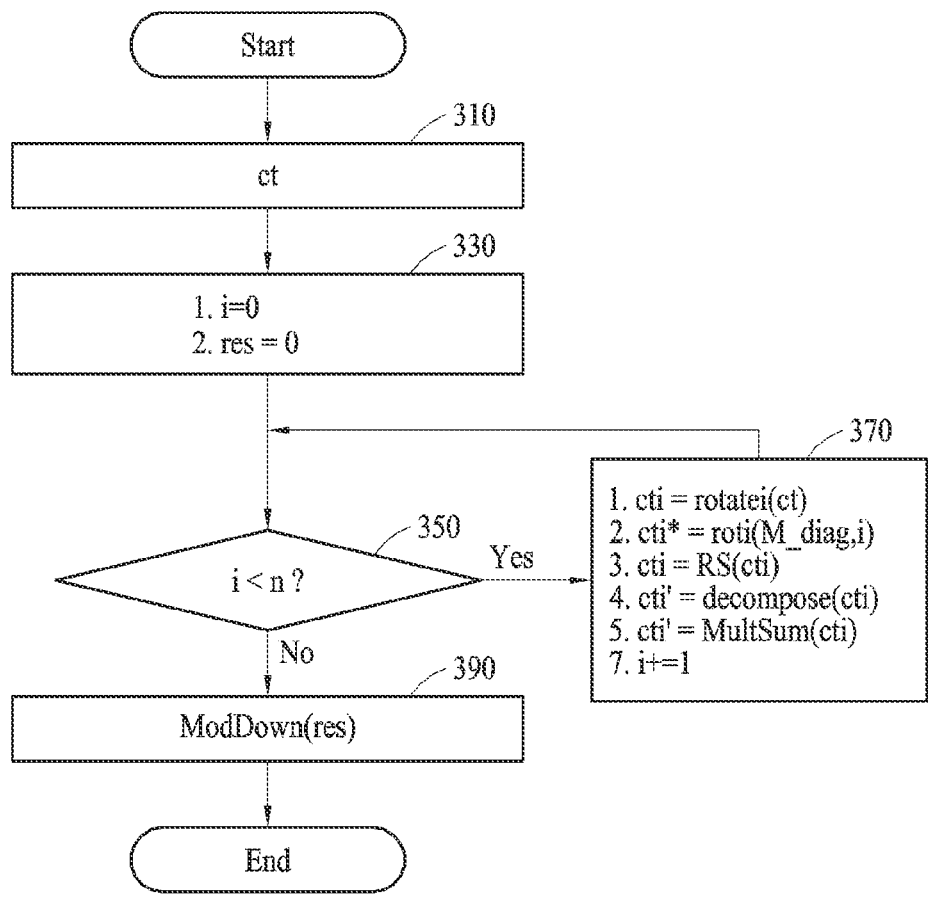
FIG. 3 illustrates an example of an encoding process.

FIG. 3 illustrates an example of an encoding process.

Referring to FIG. 3, in operation 310, a processor (for example, the processor 200 of FIG. 1) may receive a ciphertext. The ciphertext received by the processor 200 may be a ciphertext on which modulus raising is performed.

In operation 330, the processor 200 may substitute "0" for i and "0" for res. i denotes an iteration (or loop) index, and res denotes a variable in which the sum of results of rescaling operations is stored.

In operation 350, the processor 200 may determine whether i is less than n. Here, n may be the number of ciphertexts permuted in FIG. 2.

In operation 370, the processor 200 may perform an encoding operation while i is less than n. The processor 200 may store a result of a rotation operation on a ciphertext ct in cti. The processor 200 may store values of cti multiplied by diagonal components of a matrix corresponding to plaintext in cti.

The processor 200 may perform a rescaling operation on the values of cti. The processor 200 may perform a decompose operation on a rescaling result and store a corresponding result in cti'. The processor 200 may update the value of cti' by performing a sum of multiplications on the result of the decompose operation.

The processor 200 may generate an addition result by adding a result of the sum of multiplications and store the addition result in res. Thereafter, the processor 200 may add "1" to i and repeatedly perform the iteration of the encoding operation.

When the iteration is terminated, the processor 200 may perform a modulus down operation, in operation 390. The processor 200 may perform the modulus down operation on the addition result res. Accordingly, when the computational complexity of the modulus down operation in the encoding process is high, the encryption apparatus 10 of one or more embodiments may reduce the number of modulus down operations by performing the modulus down operation after all the results of the sum of multiplications are added up, thereby reducing the computational complexity.

The processor 200 may store the addition result in res and recycle memory used for cti, thereby reducing memory usage.

Figure 4:
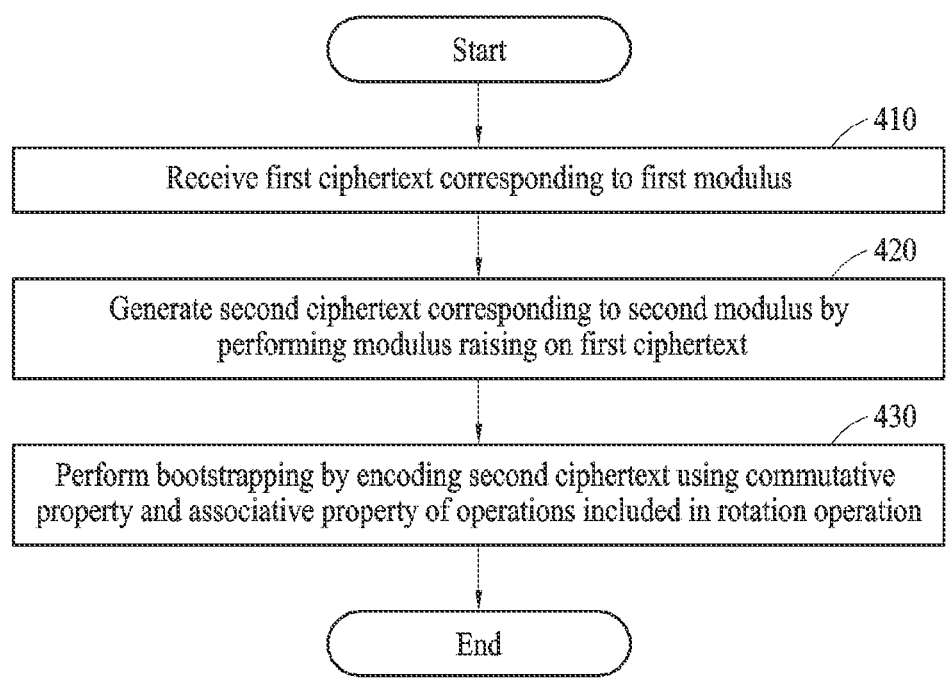
FIG. 4 illustrates an example of an encryption method performed by an encryption apparatus.

FIG. 4 illustrates an example of an encryption method performed by an encryption apparatus (e.g., the encryption apparatus of FIG. 1).

Referring to FIG. 4, in operation 410, the receiver 100 may receive a first ciphertext corresponding to a first modulus.

In operation 430, the processor 200 may generate a second ciphertext corresponding to a second modulus by performing modulus raising on the first ciphertext.

The processor 200 may generate the second ciphertext by performing modulus raising on the first ciphertext such that the value of the first modulus multiplied by a predetermined value is the second modulus.

In operation 450, the processor 200 may perform bootstrapping by encoding the second ciphertext using a commutative property and an associative property of operations included in a rotation operation.

The processor 200 may perform a permutation operation on the second ciphertext. The processor 200 may perform bootstrapping by performing a key switching operation based on a result of the permutation operation.

The processor 200 may perform a rescaling operation based on the permutation operation. The processor 200 may perform multiplications between the results of the permutation operations and the plaintext. Specifically, the processor 200 may perform a multiplication of the result of the permutation operation and a diagonal component of a matrix corresponding to the plaintext.

The processor 200 may rescale a result of the multiplication. The processor 200 may perform a decompose operation on a result of the rescaling operation. The processor 200 may perform a sum of multiplications on a result of the decompose operation.

The processor 200 may generate an addition result by adding the result of MultSum. The processor 200 may perform a modulus down operation on the addition result.

The processor 200 may perform the bootstrapping by performing modulus reduction on a result of encoding the second ciphertext. The processor 200 may perform the bootstrapping by decoding a result of the modulus reduction.

The encryption apparatuses, receivers, processors, memories, encryption apparatus 10, receiver 100, processor 200, memory 300, and other apparatuses, devices, units, modules, and components described herein with respect to FIGS. 1-4 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with homomorphic encryption, the method comprising:
   receiving a first ciphertext corresponding to a first modulus;
   generating a second ciphertext corresponding to a second modulus by performing modulus raising on the first ciphertext; and
   performing bootstrapping by encoding the second ciphertext using a commutative property and an associative property of operations included in a rotation operation,
   wherein the performing of the bootstrapping comprises:
   performing a permutation operation on the second ciphertext; and
   performing the bootstrapping by performing a key switching operation based on a result of the permutation operation, and
   wherein the performing of the bootstrapping by performing the key switching operation based on the result of the permutation operation comprises:
   performing a rescaling operation based on the permutation operation;
   performing a decompose operation on a result of the rescaling operation; and
   performing a sum of multiplications on a result of the decompose operation.

2. The method of claim 1, wherein the generating of the second ciphertext comprises generating the second ciphertext by performing modulus raising on the first ciphertext such that the value of the first modulus multiplied by a predetermined value is the second modulus.

3. The method of claim 1, wherein the performing of the rescaling operation based on the permutation operation comprises:
   performing a multiplication of the result of the permutation operation and a plaintext; and
   rescaling a result of the multiplication.

4. The method of claim 3, wherein the performing of the multiplication between the result of the permutation operation and the plaintext comprises performing a multiplication of the result of the permutation operation and a diagonal component of a matrix corresponding to the plaintext.

5. The method of claim 1, wherein the performing of the bootstrapping by performing the key switching operation based on the result of the permutation operation further comprises:
   generating an addition result by adding a result of the sum of multiplications; and
   performing a modulus down operation on the addition result.

6. The method of claim 1, wherein the performing of the bootstrapping comprises performing the bootstrapping by performing modulus reduction on a result of encoding the second ciphertext.

7. The method of claim 6, wherein the performing of the bootstrapping by performing the modulus reduction on the result of encoding the second ciphertext comprises performing the bootstrapping by decoding a result of the modulus reduction.

8. A non-transitory computer-readable storage medium storing instructions that, when executed by a processor, configure the processor to perform the method of claim 1.

9. An apparatus with homomorphic encryption, the apparatus comprising:
   a receiver configured to receive a first ciphertext corresponding to a first modulus; and
   a processor configured to
   generate a second ciphertext corresponding to a second modulus by performing modulus raising on the first ciphertext, and
   perform bootstrapping by encoding the second ciphertext using a commutative property and an associative property of operations included in a rotation operation,
   wherein, for the performing of the bootstrapping, the processor is configured to:
   perform a permutation operation on the second ciphertext; and
   perform the bootstrapping by performing a key switching operation based on a result of the permutation operation, and
   wherein, for the performing of the bootstrapping by performing the key switching operation based on the result of the permutation operation, the processor is configured to:
   perform a rescaling operation based on the permutation operation;
   perform a decompose operation on a result of the rescaling operation; and perform a sum of multiplications on a result of the decompose operation.

10. The apparatus of claim 9, wherein, for the generating of the second ciphertext, the processor is configured to generate the second ciphertext by performing modulus raising on the first ciphertext such that the value of the first modulus multiplied by a predetermined value is the second modulus.

11. The apparatus of claim 9, wherein, for the performing of the rescaling operation based on the permutation operation, the processor is configured to:

perform a multiplication of the result of the permutation operation and a plaintext; and rescale a result of the multiplication.

12. The apparatus of claim 11, wherein, for the performing of the multiplication between the result of the permutation operation and the plaintext, the processor is configured to perform a multiplication of the result of the permutation operation and a diagonal component of a matrix corresponding to the plaintext.

13. The apparatus of claim 9, wherein, for the performing of the bootstrapping by performing the key switching operation based on the result of the permutation operation, the processor is configured to:

generate an addition result by adding a result of the sum of multiplications; and perform a modulus down operation on the addition result.

14. The apparatus of claim 9, wherein, for the performing of the bootstrapping, the processor is configured to perform the bootstrapping by performing modulus reduction on a result of encoding the second ciphertext.

15. The apparatus of claim 14, wherein, for the performing of the bootstrapping by performing the modulus reduction on the result of encoding the second ciphertext, the processor is further configured to perform the bootstrapping by decoding a result of the modulus reduction.

* * * * *